July 21, 1970  H. BOUCHER  3,521,292
INTERMITTENTLY ACTUATED RECORDER
Filed Nov. 17, 1969  2 Sheets-Sheet 1
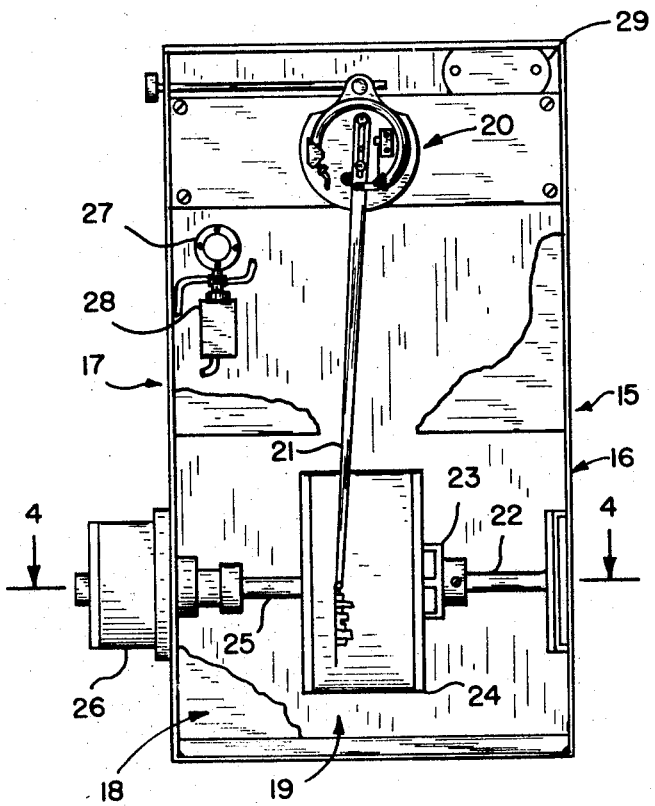
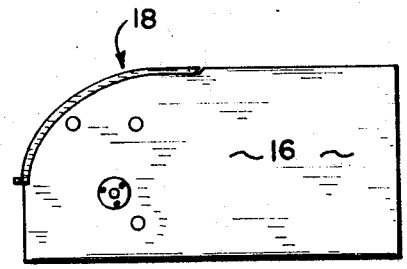
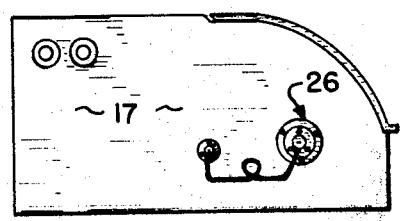
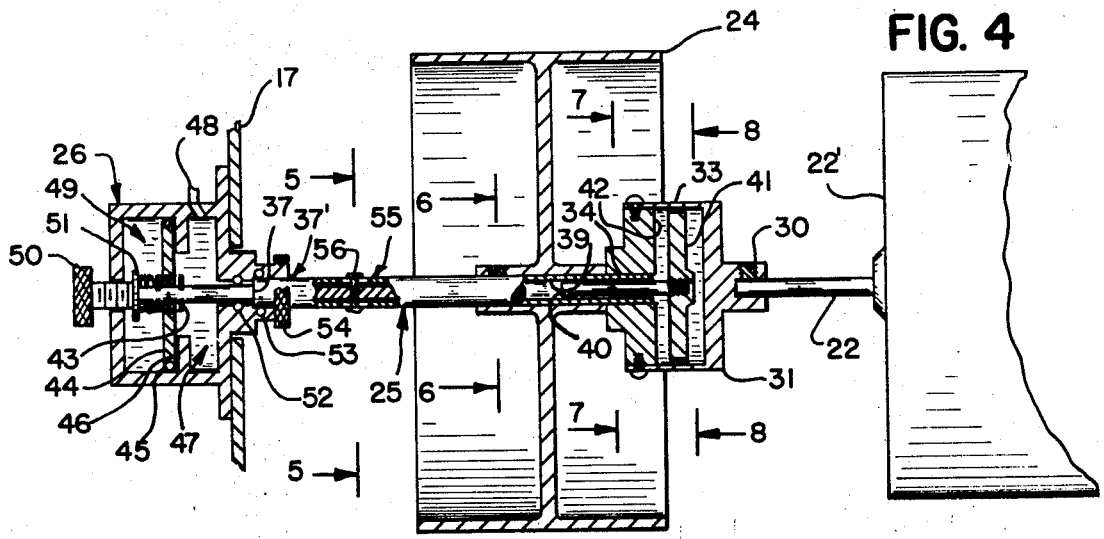
INVENTOR
HARRY BOUCHER
BY
MARCUS L. BATES

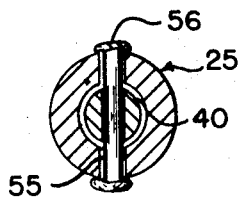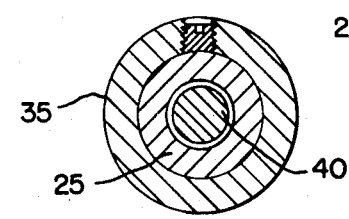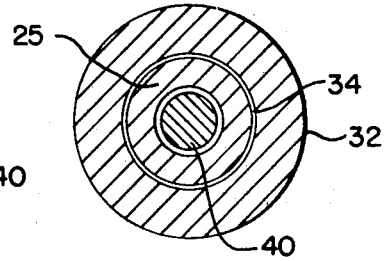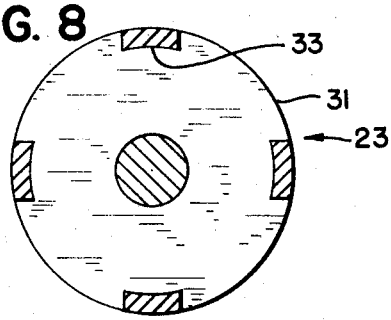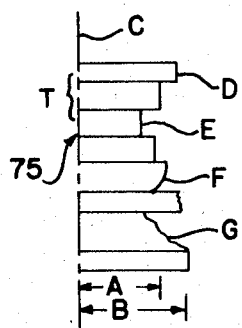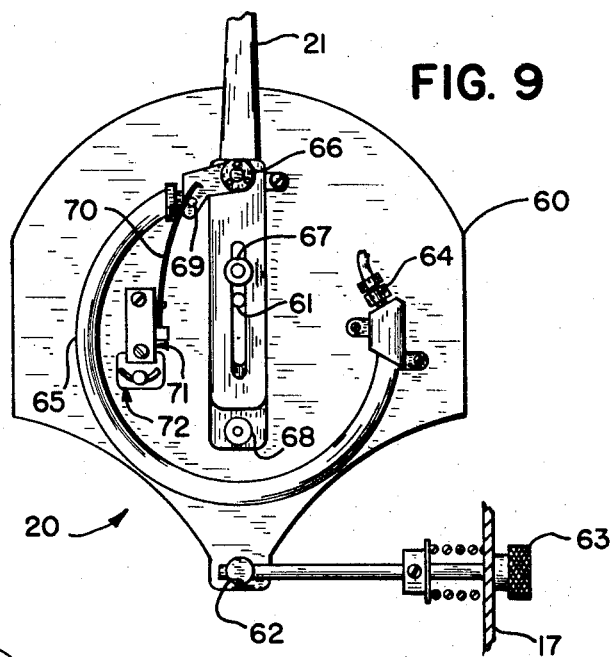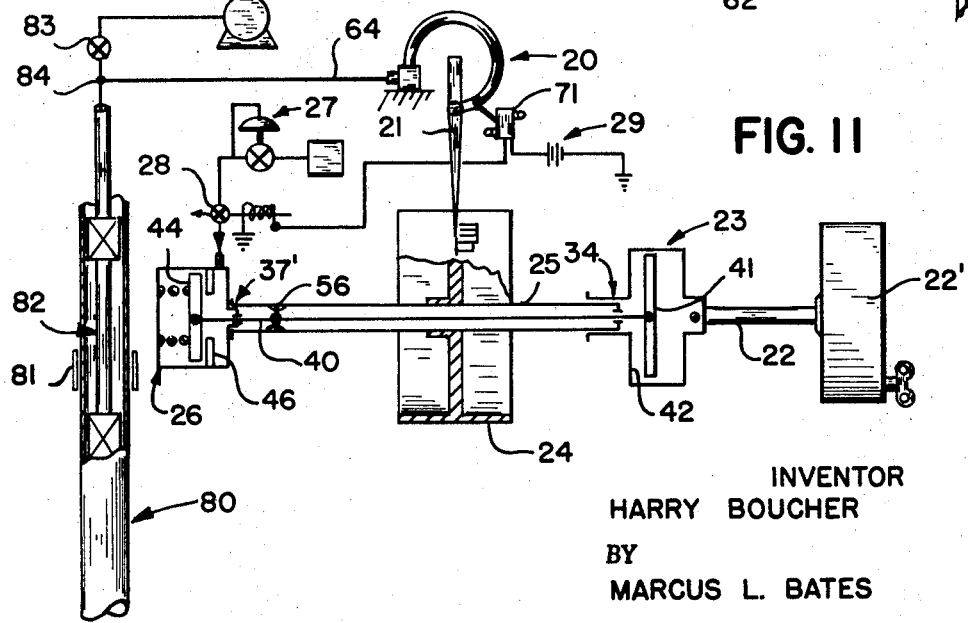

United States Patent Office 3,521,292
Patented July 21, 1970

3,521,292
INTERMITTENTLY ACTUATED RECORDER
Harry Boucher, Odessa, Tex., assignor to Vance Systems Engineering, Inc., a corporation of Texas
Filed Nov. 17, 1969, Ser. No. 877,410
Int. Cl. G01d 9/10, 15/26
U.S. Cl. 346—72         11 Claims

ABSTRACT OF THE DISCLOSURE

A recording apparatus having a scribe means, a chart means, with a brake and clutch means attached to a chart drive means. An actuator engages the clutch means and releases the brake when the scribe is moved a predetermined amount by a signal which is sensed by the scribe actuator, and releases the clutch while engaging the brake in the absence of the signal.

BACKGROUND OF THE INVENTION

There are many forms of data recording apparatus that includes a chart which moves with respect to a pen, wherein the pen forms indicia upon the chart with the indicia recording the magnitude of a selected measured variable. In testing tubular goods, such as production pipe and drill string, it is customary for the testing to be conducted by a service company, that is, an independent company whose profession is to test pipe. It is advantageous for both the service company and the owner of the pipe to have permanent records verifying the test results, because a single leaker can be disastrous under some conditions. This is especially so in testing production tubing for the reason that each individual joint of pipe is hydraulically tested as the string of tubing is made up and placed in the borehole. Recorders of the prior art are sometime used in verifying the test results, and when several thousand feet of production tubing has been tested, a voluminous amount of chart material must be analyzed in order to ascertain the quality of the entire test. The large amount of chart material results from a continuously running chart being employed as the recorder. The recorder obviously can be shut down from time to time, especially when undue delays have been encountered, however, in a conventional recording apparatus, interruption of the recorder is objectionable because sometime the operator neglects to re-energize the recording apparatus when the test is resumed, thereby detracting from the reliability of the test.

Accordingly, it is desirable to be able to record data using a minimum of chart material so as to enhance subsequent analysis thereof. It is also desirable to have a recording apparatus which is always in standby configuration, and which has a chart which moves relative to the pen thereof only when the pen is actually recording data. It is further desirable to have a recorder which is actuated only when receiving a signal of a predetermined magnitude.

SUMMARY OF THE INVENTION

This invention relates to recording apparatus having a chart which is moved relative to a scribe means by a chart drive means. The chart drive means has a clutch and brake assembly associated therewith, with the clutch being connected to a motor when the scribe means receives a signal of predetermined magnitude. The brake engages the chart drive means so as to normally prevent movement thereof when the clutch is disengaged from the motor.

The brake and clutch arrangement includes a pilot shaft which is received within a hollow drive shaft with the clutch and brake being disposed at opposite ends of the drive shaft, where they are actuated by the pilot shaft. The pilot shaft is reciprocated or actuated by means responsive to deflection of the scribe means. Accordingly, as the scribe means moves in proportion to the magnitude of a signal, the brake means is released while the clutch means engages the drive shaft with the motor to thereby enable the scribe means to record the duration and signal strength upon the chart.

It is therefore a primary object of this invention to provide recording apparatus which records the magnitude and duration of a signal and which is cyclicly actuated upon receipt of a predetermined signal strength.

Another object of the present invention is the provision of recording apparatus having a scribe means which is moved in proportion to a signal, and which actuates a chart drive means when the signal reaches a predetermined magnitude.

Still another object of the present invention is the provision of data recording apparatus having a clutch and brake arrangement which normally holds a chart means stationary with respect to a scribe means until a signal of predetermined strength deflects the scribe means in proportion thereto.

A further object of the present invention is the provision of means for recording data upon a minimum amount of chart material.

A still further object is the provision of a chart drive means which is normally held immovable until a predetermined signal strength causes a brake assembly to be released and the chart to be moved.

Another object of the invention is the provision of data recording apparatus which records a signal upon an indicia receiving material in an improved manner which enables subseqeunt analysis thereof to be rapidly carried out.

The above objects of the present invention are attained by the provision of recording apparatus having a scribe which places indicia upon a surface, and with a brake and clutch arrangement being included in a manner to cause the brake to hold the surface stationary relative to the scribe until the clutch engages a motor upon the scribe being moved by a signal which is recorded, whereupon the brake is released and the clutch causes the surface to move with respect to the scribe, to thereby record the signal strength and duration thereon.

Various other objects and advantages of this invention will become readily apparent to those skilled in the art upon reading the following detailed description and claims and by referring to the accompanying drawings.

BRIEF DESCRIPTION OF THE DRAWINGS

FIG. 1 is a top plan view of a recorder made in accordance with the present invention, with some parts thereof being broken away therefrom in order to better disclose selected portions of the invention;

FIG. 2 is a reduced side elevational view of one side of the recorder disclosed in FIG. 1; while FIG. 3 is a side elevational view, similar to FIG. 2, and showing the opposite side of the recorder of FIG. 1;

FIG. 4 is an enlarged fragmentary cross-sectional representation taken along line 4—4 of FIG. 1, with some additional parts being shown in order to better illustrate the apparatus;

FIG. 5 is an enlarged cross-sectional view taken along line 5—5 of FIG. 4;

FIG. 6 is an enlarged cross-sectional view taken along line 6—6 of FIG. 4;

FIG. 7 is an enlarged cross-sectional view taken along line 7—7 of FIG. 4;

FIG. 8 is an enlarged cross-sectional view taken along line 8—8 of FIG. 4;

FIG. 9 is an enlarged detailed plan view of part of the apparatus seen in FIG. 1;

FIG. 10 is a schematical representation of a trace which could be made on the chart drum seen in FIGS. 1 and 4; and FIG. 11 is a partly diagrammatical, partly schematical representation for the purpose of illustrating some of the operational details of the present invention set forth in conjunction with one contemplated use thereof.

DETAILED DESCRIPTION OF THE PREFERRED EMBODIMENT

FIGS. 1–3 illustrate a recording apparatus 15 suitably housed within an enclosure having side walls 16 and 17. The illustrated upper curved end portion 18 preferably is constructed of a transparent material which permits the interior of the enclosure to be viewed, such as, for example, the indicia forming scribe at 19.

The arrow at numeral 20 generally illustrates a pressure responsive device that has a scribe or pen carrying arm 21 depending therefrom. The pressure responsive device is suitably mounted within the rearward portion of the enclosure. A chart drive means is suitably disposed at the forward portion of the enclosure and includes a shaft 22 which is driven by motor 22' which, for purposes of illustration is in the form of a clock, and which imparts rotational motion into a clutch cage 23.

Looking now to FIG. 4 in conjunction with FIGS. 1–3, a drum 24 is attached to the outer peripheral surface of the longitudinally extending hollow shaft 25 and includes chart material disposed upon the outer peripheral surface of the drum for receiving the recorded variations produced by the recording scribe or pen. The pen, or scribe means, preferably is in the form of a ball point pen. The chart means preferably is comprised of a plurality of superimposed sheets of chart paper having means associated therewith which is capable of producing several duplicate copies.

Pneumatically powered piston assembly 26 constitutes an actuator which receives a signal from pressure regulator 27 by means of a solenoid actuated three-way valve 28. A storage battery 29 provides a suitable source of electrical power for the apparatus.

As illustrated in FIG. 4, in conjunction with FIGS. 5–8, the before mentioned clutch cage is seen to be removably affixed to the clock shaft by a hub and fastener means 30, and further includes spaced apart vertical bulkheads 31, 32 which are tied together by spaced apart webs 33, all of which cooperate together to form the illustrated cage-like enclosure.

The cage includes bearing surface 34 which forms a journal with respect to the exterior marginal end portion of the hollow shaft. Hub 35 is rigidly but removably secured to the outer peripheral surface of the hollow shaft and has several spokes depending radially therefrom for supporting the drum which in turn supports the recording chart material. Between one end portion of hub 35 and an end portion of the clutch cage is disposed a vertical low friction interface. The marginal end portion 37 of the outermost surface of the hollow shaft has journal means 37' formed thereon. The hollow shaft has a passageway generally seen at 39 which extends longitudinally through the shaft for receiving a pilot shaft in the form of a rod 40 in close tolerance relationship therewithin. One terminal end of the pilot shaft is secured by any suitable means to a clutch disk 41, with the clutch disk having a contacting friction developing face which is movable into engagement with a circular clutch plate formed at 42. The clutch plate and clutch cage cooperate together to form a clutch means or clutch assembly.

The actuator reciprocatingly receives a piston 44 therein. The piston is provided with a circumferentially disposed O-ring 45 with one face of the piston being of friction developing material which is normally forced into engagement with a complementary brake plate 46 when the apparatus is arranged in the "stand-by" configuration.

Chamber 47 is connected to a suitable air conduit 48 by the illustrated air passageway. The piston divides the housing of the powered piston assembly into the before mentioned chamber 47 and an atmospheric chamber of a piston receiving chamber 49. Adjustment 50 threadedly engages a wall of the chamber and includes circular element 51 thereon for adjustably maintaining the illustrated spring in compressed relationship between the piston and the last named element so as to normally bias the piston towards the brake plate.

O-rings 52, 53, respectively, preclude flow of air from chamber 47 towards longitudinally extending slot 55. The last named slot receives a pin 56 therethrough with the pin being affixed to the pilot rod in the illustrated manner so as to provide a lost motion coupling in the form of a splined connection. Other types of splined connections, known to those skilled in the art, may also be employed in lieu of the illustrated pin and slot arrangement, if deemed desirable.

The details of FIG. 9 set forth a base or mount plate 60 which is journaled to enclosure structure at 61, and is further provided with an adjustable linkage in the form of a threaded journal 62 which is adjustably actuated by spring-loaded knurled knob 63, and which enables the arm 21 to be laterally adjusted or calibrated.

High pressure inlet 64 deforms Bourdon tube 65 in the usual manner. The tube is connected to the pen arm by means of the usual precision made journal 66, the details of elements 64–66 being known to those skilled in the art. Upstanding pin or rod 69 bears against actuator arm 70 of microswitch assembly 71, with the microswitch housing being adjustable by the set screw arrangement illustrated by the arrow at number 72. The pen arm can be adjusted in both a lateral and longitudinal direction by means of the before mentioned adjustments 63, 67, and 68.

Those skilled in the art, having read the foregoing descriptive portion of the disclosure, will now realize that the recorder set forth in the foregoing figures and in the schematical representation of FIG. 11 can be utilized in the following manner: tubing 80, such as borehole casing, production pipe, drill pipe, or other tubular goods having any type of threaded joint 81 and being leak-tested by spaced apart packers mounted on a mandrel 82, is provided with high pressure fluid by the illustrated pump arrangement. The pump supplies high pressure non-compressible fluid through valve 83, the details of which are known to those skilled in the art. At junction 84 a pressure signal is applied to the Bourdon tube 20 which deflects or expands the Bourdon tube when the pump is actuated. A source of fluid pressure, such as air, is connected to the pressure regulator and to the piston assembly by means of the series connected solenoid actuated three-way valve. The valve connects chamber 47 either to the atmosphere or to the regulator.

With the clock running, and with no pressure being effected at 84, the clutch cage will be idling on journal 34 for the reason that the clutch disk is disengaged from the clutch plate. At the same time, however, the brake plate is engaged with the circular brake disk and accordingly, the chart drum is releasably locked into its present illustrated position by means of the splined connection. Upon pressure of a predetermined value or magnitude being effected at 84, pin arm 21 will be moved by the pressure responsive device 20, thereby tripping the microswitch at a predetermined minimum pressure value. This action permits current to flow from battery 29, through the switch, and to the solenoid valve, thereby moving the valve which heretofore connected chamber 47 to atmospheric to the position which flow connects the regulated source of air pressure to chamber 47, thereby moving the piston in a direction away from the brake plate. This action simultaneously moves the clutch plate into engagement with the clutch disk thereby locking the motor shaft 22 to the hollow or drive shaft by means of the splined connection as the brake is released. The clock will now rotate the chart drum while the pen traces indicia on the chart in proportion to the deflection brought about by the action of the Bourdon tube, so long as the predetermined minimum pressure value or range is effected at 84. Upon completion of the test, the pressure is released from the mandrel, or reduced at 84, causing the microswitch to open which interrupts current flow to the solenoid valve 28, whereupon the chamber 47 is exhausted to atmosphere while the piston moves the pilot shaft to cause the clutch to be released or disengaged from the motor, while the piston 44 again locks the chart into fixed position until the next test cycle.

OPERATION

In operation, the apapratus of FIG. 1 will be described in conjunction with a tool for detecting pipe leaks, such as seen in the Paul Gawlik patent, No. 2,998,721. As seen in FIG. 11 of the present invention, a multiplicity of pipe joints 80 are threadedly connected together at 81 and are undergoing pressure test by the pipe joint testing apparatus 82. The string of pipe may be disposed within a borehole, or may be laying horizontally upon a pipe rack. A pump connected to valve 83 provides a source of high pressure fluid for the testing apparatus and is connected at 84 by conduit 64 to the Bourdon tube of the present invention. When valve 83 is opened, the threaded connection which is to be tested is subjected to the high pressure effected by the pump, with the illustrated packers of the testing tool preventing fluid flow away from the test joint annulus. After the presure has reached a predetermined magnitude, it is held for a specified time interval, after which the valve 83 is closed and the pump pressure released. During this time it is determined whether leakage is occurring at the pipe joint. Obviously, if the pressure remains substantially constant it can be assumed that the joint is sufficiently tight and suitable for use downhole in an oil well.

As the Bourdon tube deflects the pen arm, the scribe places indicia upon the chart drum in the manner of FIG. 10, for example. As the arm 21 moves, microswitch 71 connects battery 29 to the solenoid actuated valve 28, whereupon valve 28 is moved from the exhaust position to the flow connecting position, and air pressure is received from the source and through the regulator at 27. The air pressure is received at chamber 47 and forces piston 44 to the left, thereby releasing the face of the piston from brake disk and at the same time moving the pilot shaft to the left. This action causes the friction face of the clutch to engage the clutch disk in high friction relationship, thereby locking the clutch cage to the pilot shaft. Since the pilot shaft is connected to the hollow shaft by a splined connection, the motor now rotates the chart so long as the clutch is engaged. After a predetermined time interval, the pressure is released from the tool 82, whereupon the pen arm returns to its stand-by position indicating zero pressure gauge, causing the microswitch to be returned to the opened or non-conducting position, thereby breaking the circuit between the solenoid valve and the battery. This action causes the normally closed solenoid actuated valve to move to the stand-by position, and piston 44 moves to the right where its brake face engages the brake disk, with the air being expelled therefrom through valve 28.

Looking again to FIG. 10 which is a hypothetical representation of a plurality of tests, the indicia indicates that adjacent joints of pipe have undergone leak tests as seen indicated by the numerals *d–g*. The dot-dash line at *c* represents atmospheric pressure while *t* represents the time interval of the test, which is also the amount of travel of the chart drum relative to the scribe during one cycle of the leak test. Numeral *a* represents the magnitude of the signal received, or the test pressure to which the individual joint of pipe is subjected, while numeral *b* represents another joint test having a pressure slightly higher than that seen at *a*. The letter *d* represents a satisfactory test while the letter *e* represents a test which was conducted at a lower and unsuitable pressure elevation. Letter *f* indicates a slowly opening valve 83, while letter *g* represents a joint which is extremely undesirable due to a bad leak. It will be noted that each joint of pipe was tested at slightly different pressures and for slightly different time intervals and accordingly, each test inherently stands out from the other due to the slight variation in the test variables. Each leak test corresponding to adjacent joints can be indexed with the indicia placed on the chart.

It is pointed out that the friction of the brake is of a value which permits the drum to be forcibly rotated thereagainst by one's hand so as to facilitate replacement of the chart paper upon the chart drum by merely rotating the drum with sufficient force to overcome the friction of the brake, while at the same time avoiding overstressing any component parts. The brake holds the drum stationary with respect to the pen under normal operating conditions until the brake is released and the motor engaged with the shaft by the clutch member.

It is further pointed out that the microswitch can be adjusted by the adjustable linkage seen illustrated by the arrow at numeral 72 so as to enable the pen 69 to actuate the microswitch arm at any desired minimum pressure level. Normally, considering a testing pressure requirement of 6,000 p.s.i.g., the arm 70 will generally be adjusted to close the microswitch at a pressure of approximately 2,000 pounds so as to prevent inadvertent recording of a test cycle.

It is considered within the comprehension of this invention to utilize other actuating means 26 in lieu of the specific actuator means disclosed herein. Moreover, under some conditions it may be desirable to eliminate the pressure regulator valve 27 and to substitute therefor means directly responsive to the pressure effected at junction 84. Moreover, a fluid actuated valve 28 may be directly operated by a valve affixed to pen arm 21 if deemed desirable. The scribe means which is attached to arm 21 can be in the form of a ball point pen to eliminate possible spillage of ink upon the chart. The chart can be comprised of several superimposed sheets of chart material having means associated therewith for making permanent copies. Moreover, the recorder device of the present invention can be used in measuring pressures other than for the purpose illustrated at 80 in FIG. 11, for example, the heating cycle of a furnace.

I claim:

1. Data recording apparatus comprising: chart means; scribe means adapted to form indicia on said chart means;

a chart drive means including a motor, a clutch which can be engaged and disengaged with said motor, and a drive shaft mounted for rotation about its longitudinal axis; said drive shaft adapted to be connected to said motor when said clutch is in the engaged position; said drive shaft being connected to said chart means for moving said chart means relative to said scribe means when said clutch is engaged;

a brake means for preventing rotational movement of said drive shaft when the brake is engaged; a pilot shaft connected to said brake means and to said clutch means for disengaging the clutch means while engaging the brake means when the shaft is in a first position, and for engaging the clutch means while disengaging the brake means when the shaft is in a second position;

first signal responsive means for actuating said scribe means to cause said scribe means to be moved proportional to the signal magnitude; and second signal responsive means for moving said pilot shaft from the first to the second position.

2. The apparatus of claim 1 wherein said chart means includes a drum circumferentially disposed about and connected to said drive shaft; and said second signal responsive means includes a valve means responsive to movement of said scribe means, a pneumatically actuated piston, a housing forming a piston chamber; said piston being reciprocatingly enclosed within said housing and connected to said pilot shaft, said housing being connected to said valve means and having a wall against which a portion of said piston abuts to form said brake means; and a source of pneumatic pressure connected to said valve means to enable said piston to be moved from the first to the second position when the valve means is actuated by the scribe means.

3. The apparatus of claim 1 wherein said drive shaft has a longitudinal extending axial passageway therethrough;

said pilot shaft has a portion thereof longitudinally disposed within said passageway;

means forming a splined connection between said pilot and drive shaft to thereby enable said pilot shaft to be moved in a longitudinal direction with respect to said drive shaft;

a portion of said pilot shaft being connected to a portion of said clutch means to enable said motor to impart rotational motion into said pilot shaft which in turn causes said drive shaft to rotate the chart.

4. The apparatus of claim 1 wherein said first signal responsive means is a Bourdon tube, said scribe means is in the form of an arm connected to said tube and having a pen at the free end thereof; said Bourdon tube adapted to move said pen in proportion to the pressure imposed therein;

said second signal responsive means includes a switch means adapted to be moved to a current conducting configuration by the Bourdon tube at a predetermined pressure increase; a source of current, circuit means, a solenoid actuated valve which is normally in a first position, a source of pneumatic pressure; said switch means being connected to said source of current and to said solenoid actuated valve by said circuit means in a manner to cause said valve to assume a second flow position when said switch is closed;

a piston, a cylinder, said piston being connected to said pilot shaft and slidably received within said cylinder, said valve controlling the flow of pneumatic pressure to said cylinder to thereby actuate said pilot shaft when said switch conducts current to said solenoid actuated valve.

5. The apparatus of claim 4 wherein said brake means is disposed at one end of said pilot shaft and includes at least part of said piston;

said clutch being disposed at the opposite end portion of said pilot shaft;

biasing means for normally maintaining said clutch in the disengaged position when said switch is not conducting current.

6. The apparatus of claim 1 and further including a cylindrical housing, said drive shaft includes one end portion which is journaled within a portion of said housing, a piston connected to said pilot shaft and having a face which can be moved into engagement with an inside wall portion of said housing, to thereby form said brake means.

7. The apparatus of claim 1 wherein said clutch means includes a clutch disk attached to an end portion of said pilot shaft;

a clutch cage, means forming a journal between a marginal end portion of said drive shaft and said clutch cage, said clutch cage being connected to said motor, said clutch cage enclosing said disk and having a clutch plate thereon which cooperates with said disk when said pilot shaft is moved into the second position.

8. The apparatus of claim 1 wherein said pilot shaft is connected to said drive shaft by means forming a splined connection whereby said pilot shaft can be moved longitudinally with respect to said drive shaft, and at the same time impart rotational motion thereinto.

9. The apparatus of claim 1 and further including a cylindrical housing, means forming a journal between said drive shaft and a portion of said housing, a piston slidably received in sealed relationship within said housing and connected to said pilot shaft, said piston having a face thereon which can be moved into engagement with an inside wall portion of said housing to thereby form said brake means;

said clutch means includes a clutch disk attached to a terminal end of said pilot shaft;

a clutch cage, means forming a journal between a marginal end portion of said drive shaft and said clutch cage with said cage being connected to said motor, said clutch cage enclosing said disk and having a clutch plate thereon which contacts said disk in high friction relationship when said pilot shaft is moved into the recited second position.

10. In a recording apparatus having scribe means responsive to signal magnitude which places indicia upon a chart, wherein the chart moves with respect to the scribe means upon receiving a signal of a predetermined strength; the improvement comprising:

a drive shaft means for moving the chart, a brake means, a clutch means, a motor, said motor being connected to said drive shaft means when said clutch is engaged, said brake means preventing movement of said drive shaft means when said clutch is disengaged;

actuator means for jointly actuating said brake means and said clutch means, said actuator means normally maintaining said brake means engaged and said clutch means disengaged; said motor normally being energized; and signal responsive means for actuating said actuator means when the scribe means is moved a predetermined amount.

11. The apparatus of claim 10 wherein said drive shaft has a longitudinal extending axial passageway therethrough;

said pilot shaft has a portion thereof longitudinally disposed within said passageway;

means forming a splined connection between said pilot and drive shaft to thereby enable said pilot shaft to be moved in a longitudinal direction with respect to said drive shaft;

a portion of said pilot shaft being connected to a portion of said clutch means to enable said motor to impart rotational motion into said pilot shaft which in turn causes said drive shaft to rotate the chart.

References Cited

UNITED STATES PATENTS

| 2,193,068 | 3/1940 | Keck | 192—18 |
| 2,685,493 | 8/1954 | McDonald et al. | 346—124 |
| 2,888,311 | 5/1959 | Gaebler | 346—127 |

FOREIGN PATENTS 961,662   6/1964   Great Britain.

JOSEPH W. HARTARY, Primary Examiner

U.S. Cl. X.R.

192—18; 346—113, 128, 138